Feb. 19, 1952          R. W. THRESHER ET AL          2,586,743
DISPLAY SYSTEM FOR RADAR NAVIGATION
Filed Nov. 14, 1945                                  2 SHEETS—SHEET 1

Inventor
RUSSELL W. THRESHER
RALZEMOND B. PARKER
By Ralph L. Chappell
Attorney

Feb. 19, 1952   R. W. THRESHER ET AL   2,586,743
DISPLAY SYSTEM FOR RADAR NAVIGATION
Filed Nov. 14, 1945   2 SHEETS—SHEET 2

Inventor
RUSSELL W. THRESHER
RALZEMOND B. PARKER
By Ralph L. Chappell
Attorney

Patented Feb. 19, 1952

2,586,743

UNITED STATES PATENT OFFICE 2,586,743

DISPLAY SYSTEM FOR RADAR NAVIGATION

Russell W. Thresher and Ralzemond B. Parker,
United States Coast Guard

Application November 14, 1945, Serial No. 628,620

3 Claims. (Cl. 343—10)

(Granted under the act of March 3, 1883, as
amended April 30, 1928; 370 O. G. 757)

This invention relates to navigation and particularly to a novel method of and means for using radar for determining positions.

Radar equipment used at sea will give range and bearing on objects encountered such as land masses, vessels, and aids to navigation, and on certain types of apparatus using a cathode ray tube, the reflected radar images can be shown continuously on a screen so that the effect is a chart of the area within a given range of the apparatus. In poor visibility in an area that is known and charted, such as a harbor, it is possible to navigate solely by radar. However, when the position of a vessel along a coast line is doubtful or the radar images on the screen cannot be identified, it is inadvisable to rely solely on the radar for navigation.

It is an important object of this invention to provide a method and apparatus used in conjunction with radar which will assist in recognizing unknown or doubtful land contacts or images on the radar screen and thereby determine the exact position of the vessel or aircraft using the equipment. In poor visibility, this invention will enable the navigator of a vessel to locate his position with respect to a shore line and proceed along desired course lines. Another important object of this invention is to provide a method and means for readily comparing a chart of known area with the land contacts or other images on the radar screen and quickly determine from such comparison the position of the vessel.

More particularly, this invention provides a method of and apparatus for superimposing a known chart upon a radar screen and adjusting one with respect to the other until the known charted features are brought into substantial coincidence with the radar image and to continuously maintain such superimposed condition as long as it is desired. On one form of the invention it is possible to vary the scale of the superimposed representation through infinite graduations to bring it into exact registration with the images on the radar screen and at the same time to indicate the desired courses to follow. A novel feature of the invention is the provision of means which, as the scale of the superimposed charted representation is varied, automatically indicates the range scale used.

Although the term "vessel" is used to designate the craft whose position it is desired to locate, it is understood the invention is applicable to air-borne craft and the term "vessel" is intended to cover such use.

Various other objects, advantages and meritorious features will become more fully apparent from the following description, appended claims and accompanying drawings wherein:

Figure 1:
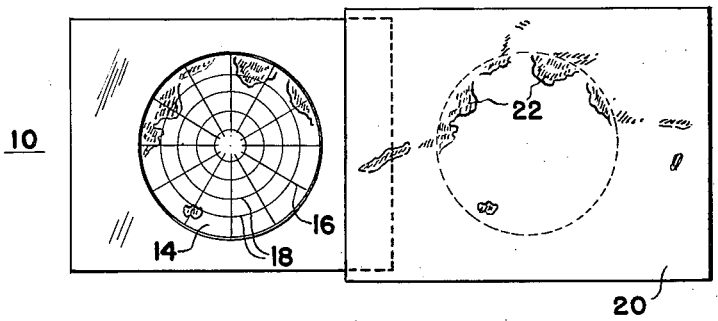
Fig. 1 is a plane view of one embodiment of the invention.
Figure 2:
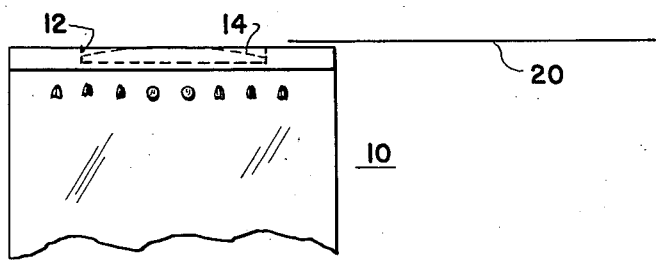
Fig. 2 is a view in elevation of the apparatus illustrated in Fig. 1.
Figure 3:
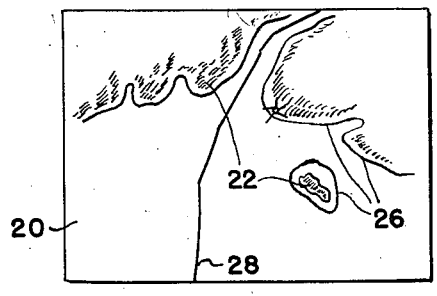
Figure 4:
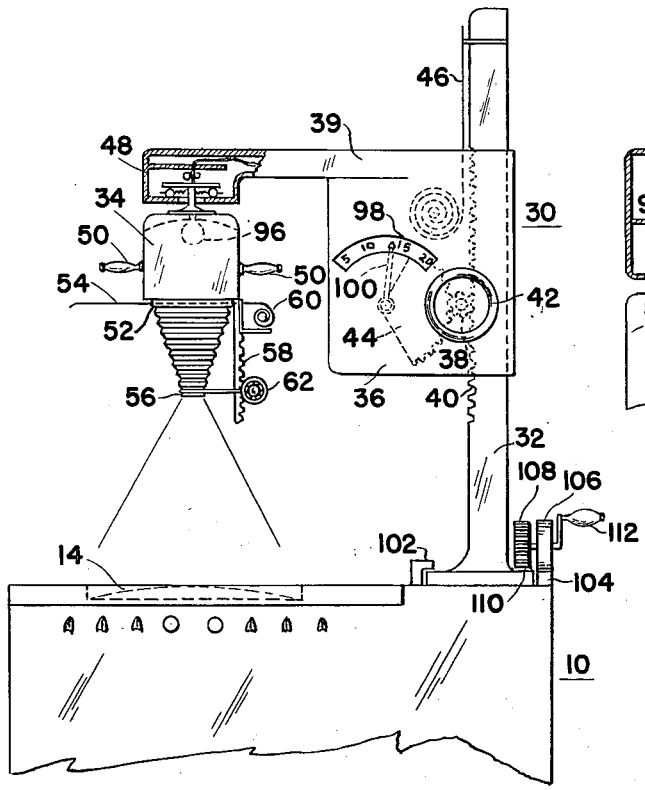
Figure 5:
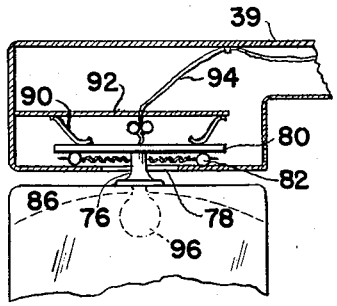
Figure 6:
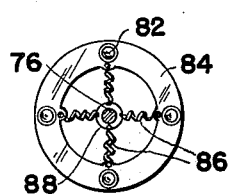
Figure 7:
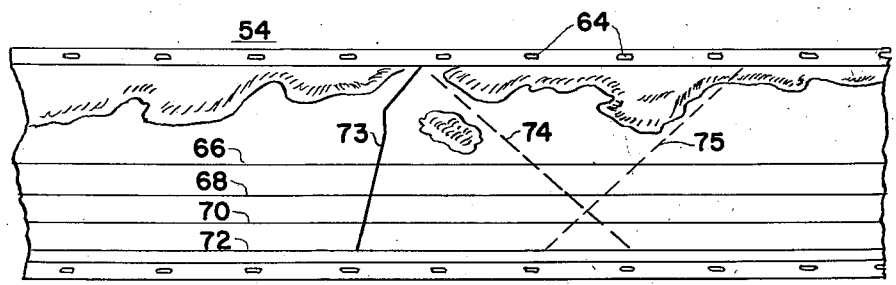
Figure 8:
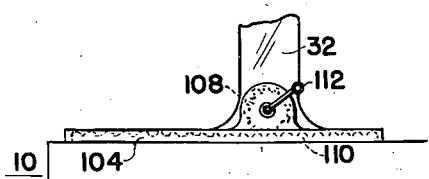

Fig. 3 is a detail view of a modified form of charted sheet adaptable for use in the apparatus of Figs. 1 and 2, Fig. 4 is a view in elevation of another embodiment of the invention, Fig. 5 is a detail sectional view of the housing in which the projection head of Fig. 4 is movably supported, Fig. 6 is a detail plane view of the roller cage of Figs. 4 and 5, Fig. 7 is an enlarged detail plane view of the film strip used in the embodiment of Fig. 4, and Fig. 8 is a side view of a portion of the apparatus showing the means for bodily shifting the projection machine.

This invention is adaptable to various types of radar apparatus, but is especially adapted for the kind which indicates on a circular screen all radar contacts within a given radius of the vessel. Specifically the preferred type is standard equipment employing a cathode ray tube which is synchronized to a gyroscopic compass and is provided with a fluorescent screen which glows for a relatively long period of time. This screen is swept by an azimuth line operating in synchronism with the continuously rotating, transmitting and receiving radar antenna. Radar waves reflected from a contact in the area are picked up by the apparatus and by strengthening the electron beam indicate the presence of the contact by a bright spot or image on the radar screen. The position of the bright spot is directly proportional to the range and bearing of the contact. Radiating and concentric lines on the screen aid the operator in calculating the exact bearing and range of the contact. The result is that when the vessel is within radar range of the shore, numerous contacts are picked up by the radar and when thrown on the screen have the appearance of a chart of the area. However, the range, height and other factors of the land cause the image on the radar screen to differ from the actual configuration of the shore line.

Referring to the drawings, in the embodiment of the invention illustrated in Figs. 1 and 2 the radar apparatus is generally indicated at 10. On the top of the apparatus is a circular recess 12 in which is disposed the radar screen 14. This screen as previously described may be the fluorescent end of a cathode ray tube of standard construction for such use. The center of the screen indicates the present position of the vessel. The cathode tube including the screen is normally controlled in its movement relative to the vessel by a gyroscopic compass so that regardless of the turning movements of the vessel all radar contacts are indicated on the screen in their true bearing relationship. Radiating lines 16 and concentric lines 18 aid in locating the bearing and range respectively of all contacts indicated on the screen. This is a conventional form of radar screen in operation.

Most radar equipment of this character is capable of being switched to relative bearings, that is, showing the objects within radar range in their relation to the heading of the vessel as distinguished from their true bearings, and this invention is equally applicable to such use.

Adapted to overlie the top of the apparatus and the screen 14 is a charted representation in the form of a sheet 20 of light permeable material having printed or otherwise affixed thereon certain markings 22 which correspond to the radar images of a shore line, for example, a harbor entrance, at a given distance therefrom. The sheet may carry a label indicating the particular area represented on the sheet. The markings 22 may be relatively opaque and contrast in color to the images formed on the radar screen. As will be more particularly described hereinafter, the sheet 20 may contain the markings 22 alone, or in addition show the actual configuration of the shore line, any aids to navigation in the area such as radar beacons and the preferred course line.

In use, the light permeable sheet 20 is superimposed over the radar screen 14 and the latter is visible through the transparent portions of the sheet. The sheet should preferably be larger than the screen as shown and contain markings covering a wider area than could be indicated on the radar screen at a given scale. Assume the vessel is standing into a harbor entrance and the visibility is such that the shore line cannot be seen. If the position of the vessel is doubtful or the land contacts on the radar screen cannot be recognized and it is desired to locate the position of the vessel, a sheet 20 containing radar markings of the area in which the vessel is belived to be is placed over the radar screen 14 and if there is a familiar relation between the markings and the image on the screen, the sheet is adjusted until the markings substantially coincide with the image. This will identify the unknown shore line and the center of the screen will indicate the position of the vessel with respect thereto.

In practice, the vessel would carry a series of charts 20 for each section of the coast where the ship is likely to travel. Each series would show the particular section of the coast line as viewed by the radar at different distances from the shore. For example, one series would show a harbor entrance as viewed on the radar screen along a preferred course line at intervals of five miles from the harbor. As the harbor is approached, the larger scale charts would be successively used. When the vessel is not on one of the five mile range intervals and off the preferred course line, exact registration of the markings 22 on the sheet with the radar image will not be possible, but they would be sufficiently close for identification and navigation. Moreover, the vessel can alter its course to get on the desired course.

Figure 3 shows a modification of the invention previously mentioned wherein the light permeable sheet 20 carries radar markings 22 overprinted upon a navigational chart 26 of a given area of the coast line. It will be noted that the radar representation of the land does not coincide exactly with the charted configurations. Radar waves being straight line propagations, low lying land and small objects are progressively lost as the range increases. Also nearby land blots out other land and objects directly behind. Except for the markings 22 and the charted areas 26 the sheet 20 is sufficiently transparent so that when placed over a radar screen the image on the latter is visible therethrough. The markings 22 and the areas 26 may be in color contrast to one another and the lighted images formed on the radar screen to facilitate comparison. The preferred course line 28 for the vessel to travel is marked on the chart and for normal approaches the navigator should maneuver the vessel to get on the course line before proceeding into the harbor.

The embodiment of the invention illustrated in Figs. 4 and 5 utilizes a method and means which provides within limits minute variations of the scale of the charted representation superimposed upon the radar screen for comparison, and economizes in the amount of material used and the time consumed in determining the exact position of the vessel. The radar apparatus 10 is similar to that previously described. Combined with the radar apparatus is a light projecting machine generally indicated at 30. This device comprises an upright supporting member 32 which may be fixed or slidably secured to the radar apparatus. It carries a light projecting head 34 similar to photographic enlarging projectors adapted to overhang the radar screen 14. Suitable means is provided for raising and lowering the head 34 relative to the top of the radar apparatus and holding it in any adjusted position. In this instance, the vertical adjusting means comprises a frame 36 having a lateral extension 39 which overhangs the radar screen and from which the head 34 is suspended. Frame 36 contains a small pinion 38 engaging a rack 40 on the supporting member 32. The pinion is engaged by a larger gear segment 44 carrying indicating means hereinafter described. The pinion 38 is provided with a knob or handwheel 42 which upon rotation in one direction or the other will cause the frame 36 and the projector head to travel up or down the supporting member 32. A counterbalancing tension spring including the metal ribbon 46 offsets the weight of the frame and head, permitting fine adjustment with minimum of effort. The head 34 is suspended from the frame by a connection 48 to be hereinafter described which provides both rotation and lateral movement of the head. Arms 50—50 assist in this rotational and lateral adjustment.

The projector head 34 contains a slotted carrier 52 through which is fed strips of film 54 or similar material. The head 34 is provided with a focusing lens 56 which is adjustable vertically to accomplish this purpose by a rack and pinion 58 controlled by knob 62. This is standard construction on enlarging photographic equipment. Suitable means is provided for mounting and feeding the film strip 54 through the carrier. This may consist of a removable reel 60 supported on the rack 58 in the manner shown in Fig. 4.

An example of film 54 which may be fed through the projector head is illustrated in Fig. 7. It is slotted at spaced intervals along the margins at 64 to facilitate movement in the proper position through the carrier 52. On the film strip is printed or otherwise formed a radar image of a coast line taken for example at a minimum range of five miles at spaced intervals along the coast. Lines 66, 68, 70 and 72 represent the five, ten, fifteen and twenty mile ranges respectively from the coast line. Line 73 on the film indicates the preferred course for entering the harbor, and the normal course for a vessel entering the harbor would be along this line. Lines 74 and 75 on the film strip which may be dotted to distinguish them from the other lines, may be provided to indicate the latitude and longitude respectively of the particular area to aid in recognizing this section of the coast. Positions and characteristics of radar beacons could also be shown on the film sheet.

Since objects on the radar screen become larger and move toward the center of the screen as the vessel approaches these objects, and since the projecting apparatus as it is raised to enlarge the charted representations of these objects on the film strip causes the objects to move away from the center of the screen, some provision is necessary to maintain the radar and light projected objects on the screen in registration as the vessel proceeds either toward or away from these objects. This is accomplished in the present embodiment of the invention by the provision of the means 48 which allows rotation and lateral movement of the head 34. As shown in Fig. 5, the head 34 is provided with an upwardly projecting stub shaft 76 which enters the hollow interior of the overhanging extension 39 through a relatively wide opening 78. Fixed on the upper end of the stub shaft and within the hollowed extension 39 is a circular bearing plate 80 having a diameter greater than the opening 78. Between the bearing plate 80 and the base of the extension are rollers 82 which permit a floating movement of the plate and the head suspended therefrom horizontally in any direction. An annular member 84 shown in the plan view of Fig. 6 serves as a cage for the rollers. A plurality of radially extending coiled springs 86 connect the roller cage member to a ring 88 encircling the stub shaft and act to yieldingly hold the cage and rollers in approximately centered position around the opening 78. It is evident from this assembly that the bearing plate 80 is freely rotatable and movable in any horizontal direction within the limits of the hollow interior of the extension 39 and the opening 78. The oppositely extending handles 50—50 enable the operation to swing and slide the head 34 to register the projected objects on the film with the objects on the radar screen. To aid in holding the head in any adjusted position, spring means in the form of flexible fingers 90, fixed to an overhanging support 92, yieldingly bear down upon the top surface of the bearing plate 80. The electric wire circuit 94 to the light source indicated in dotted outline at 96 may be given sufficient slack to permit the rotational and lateral movement of the head 34.

In use, the projector would throw that part of the film on the carrier upon the radar screen in enlarged condition. For example, we assume the vessel is within approximately five miles of the coast, and because of poor visibility is not certain of what part of coast it is opposite. The film strip 54 for that coast line area has already been selected and inserted in the carrier. By slidingly adjusting the film back and forth it will be eventually possible to project an image on the radar screen which resembles the coast line. The projector head is then adjusted in height by knob 42 until the image projected substantially registers with the radar image. When that is accomplished, the vessel's position with respect to the land will be known. If it is desired to enter the harbor illustrated in the example in Fig. 7, the vessel course is altered until the center of the radar screen is on the course line.

By being able to enlarge and reduce one of the images with respect to the other, it is possible to obtain registration within limits regardless of the distance off the coast. For example, if the vessel is ten miles off the coast the radar projection would be smaller. By lowering the enlarger projector head 34, the projected image on the radar screen would be reduced until it agrees in size with the radar image on the screen. The projector head may then be adjusted laterally, and rotatively if necessary, until the radar images and the projected images coincide. By slidingly adjusting the film strip and raising and lowering the head 34 it is possible to bring about approximate coincidence. The head may then be adjusted rotatively and laterally to obtain exact registration. If the amount the head is adjusted vertically is known in mile increments, it would be possible to preset the head so that the pattern projected from the film onto the screen is in substantially the same scale as the radar images formed by the cathode ray tube.

The present embodiment accomplishes the last by the provision of a scale 98 on the frame 36 and a pointer 100 associated with the gear segment 44. This scale could show as illustrated the lowest range as five miles. The balance of the scale may be in five mile increments to the limit of the radar's range. Thus, the pointer 100 and scale 98 will serve to indicate the scale in miles of the projected image on the radar screen. For example, if the vessel is outide the five mile range the knob 42 would be turned in the direction of the greater ranges, causing the projector head to lower and reducing the scale of the projected image on the radar screen. Suppose that the circular range lines 18 on the radar screen indicate the nearest land to be twenty miles away, then the operator varies the height of the projector until the pointer 100 is opposite the twenty mile indication on the scale 98. In this way, the operator can preset the projector to substantially the scale of the objects on the radar screen before exact registration is made. Within limits the projector 34 provides infinitesimal adjustment of the scale of the chart on the film strip 54. It is thus possible to gradually increase the scale of the chart superimposed on the radar screen as the vessel approaches the shore (the reverse when the vessel is proceeding away from the shore), and keep substantially coincidence of images while using only one film section. Thus instead of a series of charts as in Fig. 3, only one chart carried on a film strip 54 is needed. Moreover, film strips have the advantage of being considerably less bulky than charts and it is obvious that they can be stored and handled with less difficulty.

As heretofore mentioned the light projecting apparatus may be slidably mounted on the top of the radar apparatus. Instead of projecting the film pattern directly on the radar screen at all times, it may be desired to have the film pattern projected along side of the radar screen for comparison purposes. To accomplish this object, the base of the upright member 32 of the light projecting apparatus is slidably received between two parallel guides indicated at 102 and 104 fixed to the table top of the radar apparatus. One of these guides is extended upwardly at an intermediate point to provide a bearing support 106 for a pinion 108 having its teeth in engagement with a rack 110 on the base of the upright member 32. A handle 112 is provided for rotating the pinion and thus cause the projector to move so that the head 34 is either suspended directly over the radar screen or over an area or screen alongside of the radar sceen. In operation, the radar operator can adjust the projector until exact coincidence of the projected image is obtained with the radar image, and having oriented himself with respect to the land objects on the radar screen, he may shift the projector to one side and follow the course of the vessel by comparing the radar image with the projected image alongside.

In the embodiment of the invention illustrated in Figs. 4 to 7, the light projecting apparatus is shown superimposing the radar screen which is shown in horizontal position. It is obvious that the latter may be inclined to the horizontal and even extend in a vertical plane. In the latter event the light projecting apparatus would be mounted to throw a horizontal beam of light upon the radar screen.

For clarity, the representation of the film strip in Fig. 7 is shown with relatively opaque lines and areas delineating land masses and helpful course and range lines printed or otherwise formed on a transparent or translucent film. The reverse, however, may be true. The film strip may be relatively opaque except for the lines and areas defining the land masses and navigational aids, and these lines and areas may be transparent or translucent to allow for the passage of light therethrough. Color filters may be used to color the light projected upon the radar apparatus to more clearly differentiate the radar image from the projected image.

It is understood that during radar navigation it is not necessary that the projector be in use at all times. Once the navigator and radar operator have oriented themselves with respect to the land masses appearing on the radar screen, the projector's use can be discontinued by cutting off the circuit to the light source in the head 34, and switching the light on occasionally when comparisons of the radar image and charted representation on the film are desired. Also it is understood that the images on the film strip may be projected in advance of arrival off the coast or harbor in order to study the conditions which are eventually to be met and to prepare the navigator and radar operator for the navigational problem. The apparatus also may be used for training purposes. Images of a coast line, harbor or an approach to an airplane landing field may be projected by the apparatus in an enlarged state upon a screen for detail examination and explanation, and then by varying the scale of the projected image simulate conditions of approach or departure.

While we have described the preferred form of our invention we do not wish to limit ourselves to the precise details as shown.

The invention described herein may be manufactured and used by or for the Government of the United States of America for governmental purposes without the payment of any royalties thereon or therefor.

We claim:

1. In a position-indicating system having a radio receiver and a cathode tube including a ray emitter and a fluorescent screen upon which the cathode rays are directed, a film having a chart, means for projecting an image of the chart of the film upon the screen, means for varying the scale of the image of the chart projected on the screen to make the scale agree with that disclosed on the screen, and means for indicating differences in range as said scale varying means is operated.

2. In a position-indicating system having a radio receiver and a cathode tube including a ray emitter and a fluorescent screen upon which the cathode rays are directed, an elongated film strip having a charted representation thereon, a light projecting apparatus spaced from said screen and arranged to project a diverging beam of light upon said screen, means for feeding said film strip through said light projecting apparatus and thereby have the image of the charted representation thereon projected in enlarged state upon said screen, means for moving the light projecting apparatus either toward or away from the screen to vary the scale of the image of the charted representation projected on the screen, and means responsive to said last mentioned means for indicating differences in range as the scale of said projected chart is varied.

3. In a position-indicating system having a radio receiver and a cathode tube including a ray emitter and a fluorescent screen upon which the cathode rays are directed, a film strip having lines thereon delineating land objects, an enlarging light projecting head having a carrier through which said film strip is adapted to be fed, a support, means connecting said head to said support so that the light projected by such head is thrown upon the screen and the images of the land objects on the film in the carrier are projected in enlarged state upon the screen, means for advancing and retracting said head toward and away from said screen to vary the scale of the images of the land objects projected by the head thereon, means providing rotational and lateral shiftable movement of said head relative to said support in a plane parallel to that of the screen, and means operatively associated with the means for advancing and retracting said head and responsive to the movement thereof for indicating the mile scale of the projected images of the land objects on the screen.

RUSSELL W. THRESHER.
RALZEMOND B. PARKER.

REFERENCES CITED

The following references are of record in the file of this patent:

UNITED STATES PATENTS

| Number | Name | Date |
|---|---|---|
| 2,027,527 | Hammond | Jan. 14, 1936 |
| 2,061,378 | Henze | Nov. 11, 1936 |
| 2,183,634 | Zworykin | Dec. 19, 1939 |
| 2,279,151 | Wallace | Apr. 7, 1942 |
| 2,299,083 | Elm | Oct. 20, 1942 |
| 2,316,550 | Bigalke | Apr. 13, 1943 |
| 2,395,966 | Goldberg | Mar. 5, 1946 |
| 2,415,424 | Gaebel | Feb. 11, 1947 |
| 2,428,427 | Loughren | Oct. 7, 1947 |

FOREIGN PATENTS

| Number | Country | Date |
|---|---|---|
| 856,256 | France | June 10, 1940 |